United States Patent
Fan et al.

(10) Patent No.: US 12,229,042 B2
(45) Date of Patent: Feb. 18, 2025

(54) SMART TEST CASE EXECUTION CYCLE ASSIGNMENT MECHANISM

(71) Applicant: Dell Products L.P., Round Rock, TX (US)

(72) Inventors: Huijuan Fan, Chengdu (CN); Jia Huang, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 160 days.

(21) Appl. No.: 18/094,487

(22) Filed: Jan. 9, 2023

(65) Prior Publication Data

US 2023/0333970 A1    Oct. 19, 2023

(30) Foreign Application Priority Data

Apr. 13, 2022 (CN) .......................... 202210389582.1

(51) Int. Cl.
G06F 11/36    (2006.01)

(52) U.S. Cl.
CPC ...... G06F 11/3688 (2013.01); G06F 11/3676 (2013.01)

(58) Field of Classification Search
CPC .......................... G06F 11/3688; G06F 11/3674
USPC .................................................. 717/124–140
See application file for complete search history.

(56) References Cited

U.S. PATENT DOCUMENTS

| | | | | |
|---|---|---|---|---|
| 7,178,063 B1 * | 2/2007 | Smith | ................ | G06F 11/3688 |
| | | | | 717/124 |
| 7,747,987 B1 * | 6/2010 | Akarte | ................ | G06F 11/3612 |
| | | | | 702/179 |
| 8,863,096 B1 * | 10/2014 | Bucur | ................ | G06F 11/3604 |
| | | | | 717/124 |
| 8,997,061 B1 * | 3/2015 | Davison | .............. | G06F 11/3688 |
| | | | | 717/124 |
| 9,424,333 B1 * | 8/2016 | Bisignani | .............. | G06F 3/0482 |
| 9,489,289 B2 * | 11/2016 | Hu | ....................... | G06F 11/3684 |
| 10,394,697 B2 * | 8/2019 | Atyam | ................ | G06F 11/3676 |
| 10,678,678 B1 * | 6/2020 | Tsoukalas | ........... | G06F 11/3664 |
| 11,182,279 B1 * | 11/2021 | Hicks | .................. | G06F 11/3692 |
| 11,281,567 B1 * | 3/2022 | Machalica | ............... | G06N 7/00 |

(Continued)

OTHER PUBLICATIONS

Debbarma et al, "Static and Dynamic Software Metrics Complexity Analysis in Regression Testing", IEEE, pp. 1-6 (Year: 2012).*

(Continued)

*Primary Examiner* — Anil Khatri
(74) *Attorney, Agent, or Firm* — Krishnendu Gupta; Lesley Leonessa

(57) ABSTRACT

Methods, system, and non-transitory processor-readable storage medium for feature coverage system are provided herein. An example method includes selecting a test case from a plurality of test cases in a software testing lifecycle system. A feature coverage system calculates a weighted metric associated with a test cycle for each test cycle in a plurality of test cycles, where each of the plurality of test cycles comprises a subset of the plurality of test cases. Using the weighted metric, the feature coverage system determines a test cycle in which to assign the test case to balance test feature coverage within the plurality of test cycles, and assigns the test case to the test cycle. The software testing lifecycle system then executes the test cycle on a system.

19 Claims, 4 Drawing Sheets

(56) References Cited

U.S. PATENT DOCUMENTS

| | | | |
|---|---|---|---|
| 11,422,924 B2* | 8/2022 | Hicks | G06F 11/3604 |
| 11,443,390 B1* | 9/2022 | Caligaris | G06Q 40/125 |
| 11,446,570 B2* | 9/2022 | Borovikov | A63F 13/70 |
| 2005/0223357 A1* | 10/2005 | Banerjee | G06F 11/3676 |
| | | | 714/E11.207 |

OTHER PUBLICATIONS

Ogasawara et al, "Experiences of Software Quality Management Using Metrics through the life cycle" IEEE, 179-188 (Year: 1996).*

Su et al, "Test Case Generation for Simulink Models using Model Fuzzing and State Solving", ACM, pp. 117-128 (Year: 2024).*

Zhu et al, "Software Unit Test Coverage and Adequacy", ACM, pp. 1-62 (Year: 1997).*

Rothermel et al, "Selecting Tests and Identifying Test Coverage Requirements for Modified Software", ACM, pp. 169-184 (Year: 1994).*

Park et al, "Feature-Sensitive Coverage for Conformance Testing of Programming Language Implementations", ACM, pp. 1-23 (Year: 2023).*

\* cited by examiner

SMART TEST CASE EXECUTION CYCLE ASSIGNMENT MECHANISM

FIELD

The field relates generally to optimizing test coverage, and more particularly to optimizing test coverage in information processing systems.

BACKGROUND

Customers demand high quality software, and adequate test coverage is one component of software quality. Comprehensive and balanced test coverage of software, therefore, is critical to the success of a software project.

SUMMARY

Illustrative embodiments provide techniques for implementing a feature coverage system in a storage system. For example, illustrative embodiments select a test case from a plurality of test cases in a software testing lifecycle system. A feature coverage system calculates a weighted metric associated with a test cycle for each test cycle in a plurality of test cycles, where each of the plurality of test cycles comprises a subset of the plurality of test cases. Using the weighted metric, the feature coverage system determines a test cycle in which to assign the test case to balance test feature coverage within the plurality of test cycles and assigns the test case to the test cycle. The software testing lifecycle system then executes the test cycle on a system. Other types of processing devices can be used in other embodiments. These and other illustrative embodiments include, without limitation, apparatus, systems, methods and processor-readable storage media.

DETAILED DESCRIPTION

Figure 1:
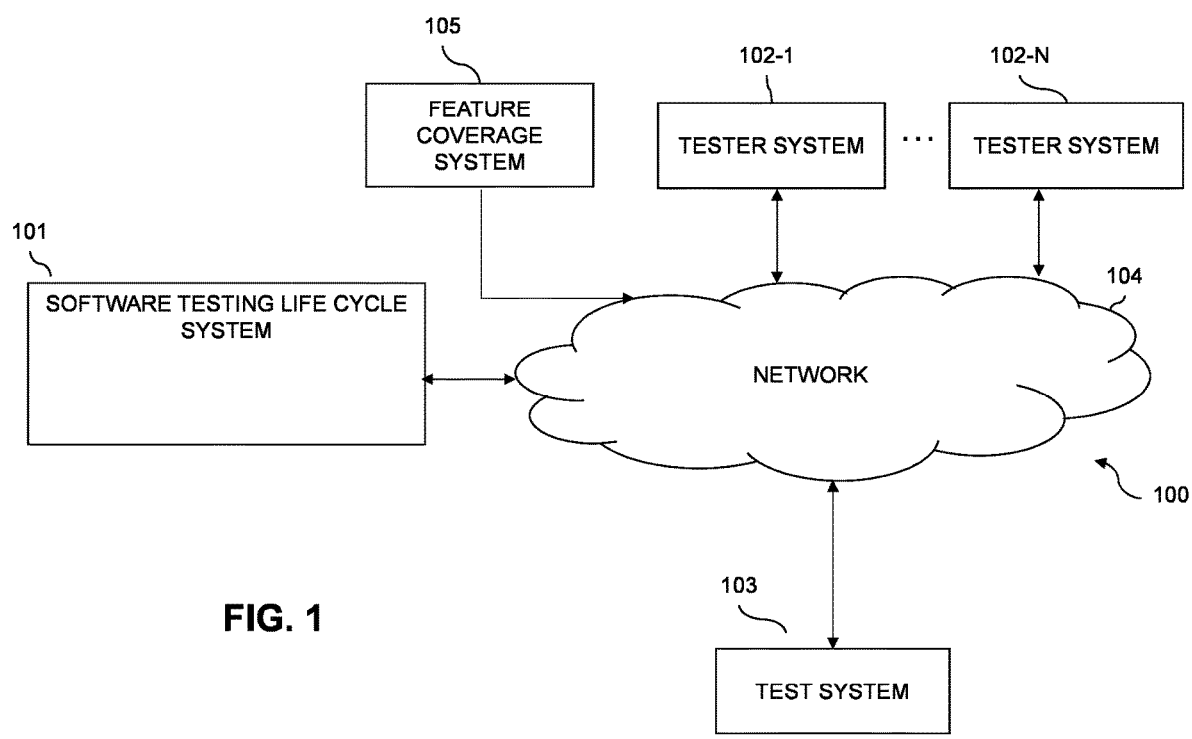
FIG. 1 shows an information processing system including a feature coverage system in an illustrative embodiment.

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Described below is a technique for use in implementing a feature coverage system, which technique may be used to provide, among other things, test coverage optimization by selecting a test case from a plurality of test cases in a software testing lifecycle system. A feature coverage system calculates a weighted metric associated with a test cycle for each test cycle in a plurality of test cycles, where each of the plurality of test cycles comprises a subset of the plurality of test cases. Using the weighted metric, the feature coverage system determines a test cycle in which to assign the test case to balance test feature coverage within the plurality of test cycles and assigns the test case to the test cycle. The software testing lifecycle system then executes the test cycle on a system.

The productivity of software development processes is constantly rising as customers demand higher and higher quality. Measuring the test coverage of test software is critical to the success of software projects. The software testing life cycle (STLC) is a sequence of activities that occur during software testing. An important phase of STLC and the entire software development process is test case execution. An important aspect of test case execution is having a test case assignment mechanism that assigns test cases to test cycles to thoroughly test the product from different angles and locate possible product defects/test failures/bugs as early as possible. Early detection is important so that issues can be addressed earlier in the STLC, and fixes can be verified in later test cycles. There may be hundreds of test cases per test domain and thousands of test cases for testing a product/system.

Conventional technologies for assigning test cases to test cycles within a STLC system rely on software testers to manually assign test cases to test cycles. Conventional technologies do not provide a system for distributing test cases evenly among the test cycles to insure test related feature coverage as well as global distribution balance.

By contrast, in at least some implementations in accordance with the current technique as described herein, test feature coverage is optimized by selecting a test case from a plurality of test cases in a software testing lifecycle system. A feature coverage system calculates a weighted metric associated with a test cycle for each test cycle in a plurality of test cycles, where each of the plurality of test cycles comprises a subset of the plurality of test cases. Using the weighted metric, the feature coverage system determines a test cycle in which to assign the test case to balance test feature coverage within the plurality of test cycles and assigns the test case to the test cycle. The software testing lifecycle system then executes the test cycle and, therefore, the test case on a system. The feature coverage system considers test case related features' coverage, test case related testers' workloads among the test cycles, test cases' priority attributes, and test cases' dependency relationship on other test cases.

Thus, a goal of the current technique is to provide a method and a system for providing a feature coverage system that can assign test cases to test cycles to achieve optimal balance. Another goal is to maximize the effectiveness and efficiency of the test cycles (i.e., for example, by finding test failures/bugs earlier in the testing process to provide a remedy and then re-test) to provide a better, more robust product for the customer. Another goal is to distribute test cases equally within the test cycles system wide to ensure as many features as possible are tested within the test cycles. Another goal is to distribute test cases evenly among the test cycles within a tester system so that each tester system has a similar workload in each test cycle. Another goal is to assign test cases with a higher priority as early in a test cycle as possible. Yet another goal is to ensure that a test case's dependency on another test case is taken into account.

In at least some implementations in accordance with the current technique described herein, the use of a feature coverage system can provide one or more of the following advantages: providing an automated, comprehensive assignment of test cases to test cycles, providing a system for distributing test cases evenly among test cycles and tester systems to insure test related feature coverage and global distribution balance, providing optimal balance when assigning test cases to test cycles, maximizing the effectiveness and efficiency of the test cycles by detecting failures early in the testing cycles and re-testing test cases, distributing test cases evenly within tester systems balance workload among the tester systems, and assigning higher priority test cases earlier within the test cycle.

In contrast to conventional technologies, in at least some implementations in accordance with the current technique as described herein, test feature coverage is optimized by selecting a test case from a plurality of test cases in a software testing lifecycle system. A feature coverage system calculates a weighted metric associated with a test cycle for each test cycle in a plurality of test cycles, where each of the plurality of test cycles comprises a subset of the plurality of test cases. Using the weighted metric, the feature coverage system determines a test cycle in which to assign the test case to balance test feature coverage within the plurality of test cycles and assigns the test case to the test cycle. The software testing lifecycle system then executes the test cycle on a system.

In an example embodiment of the current technique, the software testing life cycle system detects a test failure that occurred during the execution of the test cycle on the system. The feature coverage system defines the plurality of test cases based on the test failure.

In an example embodiment of the current technique, for each test case in the plurality of test cases, the feature coverage system determines whether each test case is assigned to any test cycle in the plurality of test cycles, and repeats the steps of selecting, calculating, determining, and assigning for each test case that is not assigned.

In an example embodiment of the current technique, the feature coverage system determines the test case has a dependency on a second test case and determines the second test case is not assigned to any test cycle in the plurality of test cycles. The feature coverage system selects the second test case instead of the test case.

In an example embodiment of the current technique, the feature coverage system determines the test case has a dependency on a second test case and determines the second test case is assigned to a second test cycle in the plurality of test cycles, where the plurality of test cycles has an order of execution starting from a first test cycle through a last test cycle. The feature coverage system modifies the plurality of test cycles to remove the second test cycle and any test cycles that are scheduled to execute prior to the second test cycle according to the order of execution, from the plurality of test cycles when determining the weighted metric associated with the test cycle for each test cycle in the plurality of test cycles.

In an example embodiment of the current technique, the feature coverage system selects the test cycle with a minimum weighted metric from the plurality of test cycles.

In an example embodiment of the current technique, the feature coverage system identifies a subset of the plurality of test cycles, where each of the subset has the minimum weighted metric and selects one of the subset based on a priority of execution associated with the test case.

In an example embodiment of the current technique, the feature coverage system identifies the priority of execution as a highest priority and selects the earliest executing test cycle in the plurality of test cycles as one of the subset, where the plurality of test cycles has an order of execution starting from a first test cycle through a last test cycle.

In an example embodiment of the current technique, the feature coverage system identifies the priority of execution as a medium priority and randomly selects a random test cycle in the plurality of test cycles as the one of the subset.

In an example embodiment of the current technique, the feature coverage system identifies the priority of execution as a lowest priority and selects the last test cycle in the plurality of test cycles as one of the subset, where the plurality of test cycles has an order of execution starting from a first test cycle through the last test cycle.

In an example embodiment of the current technique, each test case within a test cycle comprises an attribute set comprising at least one of a test case tag identifying features tested by the test case, test case execution time, tester system responsible for invoking execution of the test case, priority of execution of the test case, prior case dependency associated with the test case and test cycle to which the test case is assigned.

In an example embodiment of the current technique, the feature coverage system determines an extent to which a test case feature is covered within a test case.

In an example embodiment of the current technique, the feature coverage system determines an extent to which a test case feature is covered within a test cycle.

In an example embodiment of the current technique, the feature coverage system determines a test case feature coverage metric comprising an extent to which a plurality of test case features associated with a test case is covered within a test cycle.

In an example embodiment of the current technique, the feature coverage system determines a test case workload metric associated with a tester system invoking execution of the test cycle, where the test case workload metric is comprised of a total execution time of test cases within the test cycle and a predefined time period during which the tester system executes the test cycle.

In an example embodiment of the current technique, the weighted metric comprises a test case feature coverage metric, and a test case workload metric.

In an example embodiment of the current technique, the weighted metric comprises weighting each of the test case feature coverage metric and the test case workload metric.

In an example embodiment of the current technique, the feature coverage system evaluates at least one of test case distribution imbalance rate, tester system workload imbalance rate and feature coverage imbalance rate to assess a test case assignment performance of the feature coverage system.

FIG. 1 shows a computer network (also referred to herein as an information processing system) 100 configured in accordance with an illustrative embodiment. The computer network 100 comprises a software testing life cycle system 101, feature coverage system 105, tester systems 102-N, and test system 103. The software testing life cycle system 101, feature coverage system 105, tester systems 102-N, and test system 103 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a feature coverage system 105 that may reside on a storage system. Such storage systems can comprise any of a variety of different types of storage including network-attached storage (NAS), storage area networks (SANs), direct-attached storage (DAS) and distributed DAS, as well as combinations of these and other storage types, including software-defined storage.

Each of the test system 103 and tester systems 102-N may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The test system 103 and tester systems 102-N in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the feature coverage system 105 are one or more input-output devices, which illustratively comprise keyboards, displays or other types of input-output devices in any combination. Such input-output devices can be used, for example, to support one or more user interfaces to the feature coverage system 105, as well as to support communication between the feature coverage system 105 and other related systems and devices not explicitly shown. For example, a dashboard may be provided for a user to view a progression of the execution of the feature coverage system 105. One or more input-output devices may also be associated with any of the test system 103 and tester systems 102-N.

Additionally, the feature coverage system 105 in the FIG. 1 embodiment is assumed to be implemented using at least one processing device. Each such processing device generally comprises at least one processor and an associated memory, and implements one or more functional modules for controlling certain features of the feature coverage system 105.

More particularly, the feature coverage system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the feature coverage system 105 to communicate over the network 104 with the software testing life cycle system 101, test system 103, and tester systems 102-N and illustratively comprises one or more conventional transceivers.

A feature coverage system 105 may be implemented at least in part in the form of software that is stored in memory and executed by a processor, and may reside in any processing device. The feature coverage system 105 may be a standalone plugin that may be included within a processing device.

It is to be understood that the particular set of elements shown in FIG. 1 for feature coverage system 105 involving the software testing life cycle system 101, test system 103, and tester systems 102-N of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the feature coverage system 105 can be on and/or part of the same processing platform.

An exemplary process of feature coverage system 105 in computer network 100 will be described in more detail with reference to, for example, the flow diagram of FIG. 2.

Figure 2:
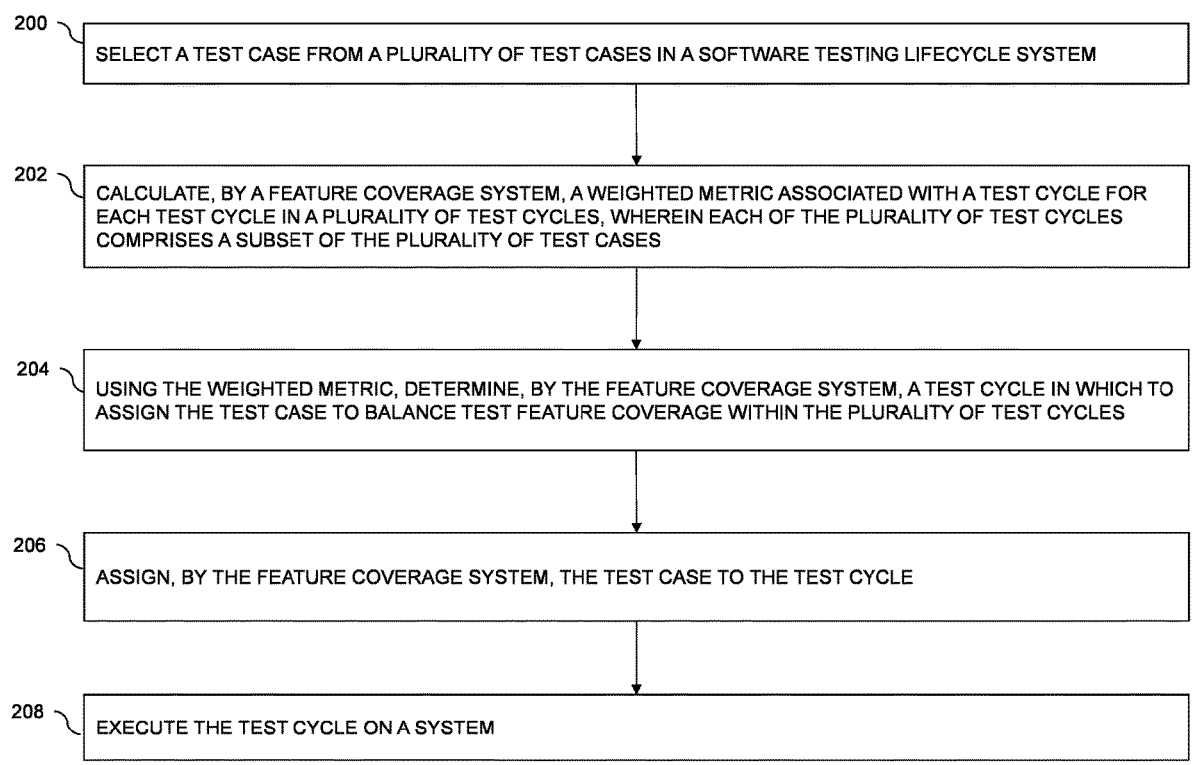
FIG. 2 shows a flow diagram of a process for a feature coverage system in an illustrative embodiment.

FIG. 2 is a flow diagram of a process for execution of the feature coverage system 105 in an illustrative embodiment. It is to be understood that this particular process is only an example, and additional or alternative processes can be carried out in other embodiments.

At 200, the feature coverage system 105 selects a test case from a plurality of test cases in a software testing lifecycle system. In an example embodiment, the feature coverage system 105 randomly selects a test case from a set of currently unassigned (meaning unassigned to a particular test cycle). In an example embodiment, the feature coverage system 105 selects the highest priority unassigned test case. In an example embodiment, a selectable test case set, TC, is comprised of the plurality of test cases where each of the test cases needs to be assigned to a test cycle. For example, if there are N test cases in the test case set (i.e, the selectable test case set), TC, then TC{test case$_1$, test case$_2$ . . . test case$_i$ . . . test case$_N$}. In an example embodiment, each of the plurality of test cycles comprises a subset of the plurality of test cases. In an example embodiment, each test case within a test cycle comprises an attribute set comprising at least one of a test case tag identifying features (identified as feature tags) tested by the test case, test case execution time, tester system responsible for invoking execution of the test case, priority of execution of the test case, prior case dependency associated with the test case and test cycle to which the test case is assigned. A test case may have one or more case tags indicating feature coverage of the test case. The test case execution time is the expected execution time of the test case. In an example embodiment, the test case execution time is pre-defined within the software testing life cycle system 101 before the case assignment plan, for example, during the test case design stage. In an example embodiment, a case tester is responsible for executing the test case, and may be pre-defined prior to the case assignment plan. In an example embodiment, the case tester may execute the test case via the tester system 102-N. In an example embodiment, the case priority indicates the test case's critical degree. For example, the higher the test case's priority, the earlier in the test cycle the test case should be executed to identify more bugs/failures earlier in the test cycle. In an example embodiment, PR1 indicates the highest priority, PR2 indicates a medium priority, and P3 indicates the lowest priority. In an example embodiment, one or more priorities may be assigned to a test case. In an example embodiment, a test case may also have a case dependency where, for example, test case A may have to run before test case B because test case A is a basic feature verification of test case B. The value of the case dependency variable may be null if, for example, test case B has no dependencies. Test case execution test cycle is the test cycle in which the test case is assigned to execute. This attribute is the weighted metric that is calculated by the feature coverage system 105. The test cycle duration is how long the test cycle is scheduled to execute. For example, a test cycle may execute for 2 business weeks. However, one of those business weeks may be 5 working days whereas another business week may be only 3 or 4 days, due to, for example, national holidays. A test cycle tag indicates the total feature tags associated with the test cycle, and represents the test cycle coverage of the features that are being tested. In an example embodiment, a test cycle may have multiple test cycle tags and/or feature tags. Thus, a test case may have one or more feature tags and a test cycle may have one or more test cycle tags.

In an example embodiment, the feature coverage system 105 determines that the selected test case has a dependency on a second test case, meaning the second test case needs to execute before the selected test case can be executed. The feature coverage system 105 then determines whether the second test case is assigned to any test cycle in the plurality of test cycles. If the second test case is not yet assigned to any test cycle, the feature coverage system 105 selects the second test case as the selected test case instead of the test case. In an example embodiment, the plurality of test cycles has an order of execution starting from a first test cycle through a last test cycle. In an example embodiment, if the feature coverage system 105 determines that the second test case is assigned to a second test cycle in the plurality of test cycles, the feature coverage system 105 modifies the plurality of test cycles to remove the second test cycle and any test cycles (from the plurality of test cycles) that are scheduled to execute prior to the second test cycle according to the order of execution. Thus, if the feature coverage system 105 determines that the second test case, test case$_1$ has already been assigned to a test cycle, then the set of test cases TC {test case$_1$, test case$_2$, . . . test case$_i$, . . . test case$_N$} is modified to become TC {test case$_i$+1, . . . test case$_N$}, and the feature coverage system 105 determines the weighted metric using TC {test case$_i$+1, . . . test case$_N$} for each test cycle in the plurality of test cycles.

At 202, the feature coverage system 105 calculates the weighted metric associated with a test cycle for each test cycle in a plurality of test cycles, where each of the plurality of test cycles comprises a subset of the plurality of test cases. The feature coverage system 105 calculates $P_{test\ case\ i, test\ cycle\ k}$ for each test cycle within the plurality of test cycles (or the "selectable test cycle set) as follows where tester m (i.e., tester system 102-N) is responsible for executing test case i):

$$P_{test\ case\ i, test\ cycle\ k} = \omega_\gamma \cdot \frac{\gamma_{test\ case\ i, test\ cycle\ k}}{\sum_{selectable\ test\ cycle\ set} \gamma_{test\ case\ i, test\ cycle\ k}}$$
$$+ \omega_W \cdot \frac{W_{test\ cycle\ k, tester\ m}}{\sum_{selectable\ test\ cycle\ set} W_{test\ cycle\ k, tester\ m}}$$

In an example embodiment, the feature coverage system 105 determines an extent to which a test case feature is covered within a test case, defined as $\gamma_{case\ i, tag\ j}$. In an example embodiment, if $\gamma_{case\ i, tag\ j}=1$, then test case i has attribute of feature tag j. Conversely, if $\gamma_{case\ i, tag\ j}=0$, then test case$_i$ does not have an attribute of feature tag j.

In an example embodiment, the feature coverage system 105 determines an extent to which a test case feature is covered within a test cycle. In other words, to what degree the feature j is covered in test cycle k. In an example embodiment, the extent to which a test case feature is covered within a test cycle is the sum correlation degree of the test case with feature tag j that is assigned to the test cycle k. For example, test cycle k with feature tag j is defined as:

$$\gamma_{cycle\ k, tag\ j} = \sum_{case\ i \in cycle\ i} \gamma_{case\ i, tag\ j}$$

In an example embodiment, the feature coverage system 105 determines a test case feature coverage metric comprising an extent to which a plurality of test case features associated with a test case is covered within a test cycle. The test case feature coverage metric is the degree to which the test case i's correlated feature tags j are covered within test cycle k regardless of whether test case i is assigned to test cycle k. In other words, it is the correlation degree of test cycle k with all the feature tag(s) j that are associated with test case i. The test case feature coverage metric is equal to the sum correlation degree of the test case i with feature tag j that is assigned to test cycle k. The test case feature coverage metric may be calculated as follows:

$$\gamma_{case\ i, cycle\ k} = \sum_{tag\ j \in case\ i} \gamma_{cycle\ k, tag\ j} = \sum_{tag\ j \in case\ i} \sum_{case\ x \in cycle\ i} \gamma_{case\ x, tag\ j}$$

In an example embodiment, the feature coverage system 105 determines a test case workload metric associated with a tester system invoking execution of the test cycle. The test case workload metric is comprised of a total execution time of test cases within the test cycle and a predefined time period during which the tester system executes the test cycle. In an example embodiment, the total execution time of total execution time of test cases within the test cycle, $T_{cycle\ k, tester\ m}$, is defined by units, such as the number of days tester system 102-N (i.e., tester m) is scheduled to execute the test cases in test cycle k. Other units of time may also be used.

In an example embodiment, the working number of units (i.e., such as days) of test cycle k is defined as $T_{cycle\ k}$. In an example embodiment, this may be defined as a fixed duration, such as 2 weeks. However, the working number of days for test cycle k may change if, for example, there are any work holidays within a particular 2 weeks span. In an example embodiment, for consistency, the units used to define $T_{cycle\ k,tester\ m}$ may be the same units used to define $T_{cycle\ k}$, for example, "days".

In an example embodiment, the feature coverage system 105 determines the test case workload metric as the workload percentage of tester system 102-N in test cycle k. The test case workload metric is defined as follows:

$$W_{cycle\ k,tester\ m} = \frac{T_{cycle\ k,tester\ m}}{T_{cycle\ k}}$$

In an example embodiment the feature coverage system 105 calculates the weighted metric as the test case feature coverage metric, and a test case workload metric where each of the test case feature coverage metric and the test case workload metric are weighted. The weighted metric is calculated as follows:

$$P = \omega_\gamma \cdot \gamma + \omega_W \cdot W$$

The variables $\omega_{65}$ and $\omega_W$, for the weights of the test case feature coverage metric, and a test case workload metric, and $\omega_\gamma + \omega_W = 1$. In an example embodiment, by tuning the weights, the feature coverage system 105 can achieve better overall balancing results of the feature coverage of the test system 103.

As noted above, the feature coverage system 105 calculates $P_{test\ case\ i,test\ cycle\ k}$ for each test cycle within the plurality of test cycles (or the "selectable test cycle set") as follows (where tester m, tester system 102-N, is responsible for executing test case i):

$$P_{test\ case\ i,test\ cycle\ k} = \omega_\gamma \cdot \frac{\gamma_{test\ case\ i,test\ cycle\ k}}{\sum_{selectable\ test\ cycle\ set} \gamma_{test\ case\ i,test\ cycle\ k}}$$
$$+ \omega_W \cdot \frac{W_{test\ cycle\ k,tester\ m}}{\sum_{selectable\ test\ cycle\ set} W_{test\ cycle\ k,tester\ m}}$$

The P in the $P = \omega_\gamma \cdot \gamma + \omega_W \cdot W$ equation is the variable $P_{test\ case\ i,test\ cycle\ k}$ in the above equation.

At 204, using the weighted metric, the feature coverage system 105 determines a test cycle in which to assign the test case to balance test feature coverage within the plurality of test cycles, and at 206, the feature coverage system 105 assigns the test case to the test cycle.

In an example embodiment, when assigning the test case to the test cycle, the feature coverage system 105 selects the test cycle with a minimum weighted metric ($P_{test\ case\ i,test\ cycle\ k}$) from the plurality of test cycles.

In an example embodiment, the feature coverage system 105 may identify a subset of the plurality of test cycles, where each of the subset has the minimum weighted metric. In other words, there is more than one test cycle that has the same weighted metric ($P_{test\ case\ i,test\ cycle\ k}$). In an example embodiment, if there are multiple test cycles with the same minimum weighted metric, the feature coverage system 105 selects one of the subset based on a priority of execution associated with the test case. In an example embodiment, the plurality of test cycles has an order of execution starting from a first test cycle through a last test cycle.

For example, the feature coverage system 105 may identify the priority of execution associated with a test case as the highest priority, PR1. In this example embodiment, the feature coverage system 105 selects the earliest executing test cycle in the plurality of test cycles from the subset of test cycles to which to assign the test case. In other words, when the feature coverage system 105 identifies multiple test case cycles that have the same weighted metric, if the priority associated with the test case is a high priority, the feature coverage system 105 selects the earliest executing test cycle (from the group of multiple test cycles that have the same weighted metric) to which to assign the test cycle.

In an example embodiment, the feature coverage system 105 may identify the priority of execution associated with a test case as a medium priority, PR2. In this example embodiment, the feature coverage system 105 selects a random test cycle in the plurality of test cycles from the subset of test cycles (i.e., the group of multiple test cycles that have the same weighted metric) to which to assign the test case.

In an example embodiment, the feature coverage system 105 may identify the priority of execution associated with a test case as the lowest priority, PR3. In this example embodiment, the feature coverage system 105 selects the latest executing test cycle in the plurality of test cycles from the subset of test cycles to which to assign the test case. In other words, when the feature coverage system 105 identifies multiple test case cycles that have the same weighted metric, if the priority associated with the test case is a low priority, the feature coverage system 105 selects the latest executing test cycle (from the group of multiple test cycles that have the same weighted metric) to which to assign the test cycle.

At 208, the feature coverage system 105 executes the test cycle on the test system 103. In an example embodiment, the feature coverage system 105 detects a test failure that occurred during the execution of the test cycle on the test system 103, and redefines a bug related plurality of test cases TC { } based on the test failure. The feature coverage system 105 then calculates the weighted metric for each test case in the newly defined bug related TC { } and assigns those test cases to their respective test cycles. In an example embodiment, test failure/bug detection may result as planned or unplanned testing requirements. For example, a test failure/bug that is generated because of testing requirements added midway through the software testing life cycle system process (such as when a software patch is added or a new feature is added), can be described as planned. In this example scenario, two test case sets are defined, TC1 { } and TC2 { }. In an example embodiment, there are 1,000 test cases assigned to 10 test cycles, and a new version of code containing a critical bug fix is added during the execution of the 6$^{th}$ test cycle (of the 10 test cycles). In this example embodiment, there may be 500 test cases, TC1 { }, that are not yet executed. There may also be 200 test cases, TC2 { }, that need to be re-executed to verify the new version of code. In one example embodiment, the feature coverage system 105 reassigns the 700 test cases into the remaining 5 test cycles. In another example embodiment, the feature coverage system 105 assigns the 200 test cases into the remaining 5 test cycles, but maintains the original test cycle assignment of the 500 test cases. In an example embodiment, a feature available cycle parameter may be defined that limits test cases associated with certain test features to execute only after certain test cycles have completed execution.

In an example embodiment, there are 1,000 test cases assigned to 10 test cycles, and a new version of code that does not test all the features that the previous version of code tested (meaning there are "dropped features" from the code) is added during the execution of the 6$^{th}$ test cycle (of the 10 test cycles). This example scenario can be described as unplanned testing requirements. In this example embodiment, there may be 500 test cases, TC1 { }, that are not yet executed. Assuming 100 of those 500 test cases test the dropped features, the feature coverage system 105 reassigns the remaining 400 test cases to the remaining 5 test cycles. In another example embodiment, if the dropped features result in modifying the testing requirements that only 3 of the 5 test cycles need to be executed, then the feature coverage system 105 may assign the remaining 400 test cases to those 3 test cycles. In an example embodiment, a "bug ready to verify" parameter may be added to indicate that test cases that triggered unplanned failures/bugs need to be re-assigned by the feature coverage system 105 to respective test cycles to repeat testing of that test case.

In an example embodiment, for each test case in the plurality of test cases, the feature coverage system 105 determines whether each test case in the plurality of test cases is assigned to any test cycle in the plurality of test cycles. If each test case is assigned, then the feature coverage system 105 is finished. If not, the feature coverage system 105 repeats the steps of selecting a test case, calculating the weighed metric, determining a test cycle in which to assign the test case, and assigning the test case to the test cycle. In other words, initially the feature coverage system 105 randomly selects an unassigned test case with the highest priority, and checks if the test case has a dependency, for example, a first test case. If the test case has a dependency, the feature coverage system 105 checks if the first test case has been assigned. If the first test case has not been assigned, the feature coverage system 105 selects the first test case as the test case instead of the "unassigned test case with the highest priority". If the first case has been assigned, the feature coverage system 105 modifies the selectable test cycle set from TC {test case$_1$, test case$_2$, . . . test case$_i$, . . . test case$_N$} to TC {test case$_i$+1, . . . test case$_N$}, and then calculates the weighted metric for each test cycle in the selectable test cycle set. If the "unassigned test case with the highest priority" does not have a dependency, then the feature coverage system 105 calculates the weighted metric for each test cycle in the selectable test cycle set. The feature coverage system 105 selects the test cycle with the minimum weighted metric as the test cycle to which to assign the test case. The feature coverage system 105 then checks if all test cases are assigned, and if not, the feature coverage system 105 repeats the process starting with selecting an unassigned test case with the highest priority until all test cases are assigned.

In an example embodiment, the feature coverage system 105 evaluates at least one of test case distribution imbalance rate, tester system workload imbalance rate and feature coverage imbalance rate to assess a test case assignment performance of the feature coverage system. In an example embodiment, the test case that is assigned to be executed in test cycle k is defined as $C_{cycle\ k}$. A test case distribution imbalance rate among test cycles is calculated with N representing the total number of test cases and L representing the total number of test cycles as:

$$\mu = \frac{\sqrt{\frac{\sum_{k=1}^{L}(C_{cycle\ k} - N/L)^2}{L-1}}}{N/L}$$

In an example embodiment, the total execution time of the test cases executing, where the test cases are executed on tester system 102-N (represented as tester m) is defined as:

$$T_{tester\ m} = \sum_{k=1}^{L} T_{cycle\ k,\ owner\ m}$$

In an example embodiment, the workload imbalance rate among test cycles associated with tester system 102-N (represented as tester m, where tester m belongs to the set of {1, . . . , M}) is defined as follows:

$$\delta_{tester\ m} = \frac{\sqrt{\frac{\sum_{k=1}^{L}(T_{cycle\ k,\ tester\ m} - T_{tester\ m}/L)^2}{L-1}}}{T_{tester\ m}/L}$$

In an example embodiment, the coverage imbalance rate for feature tag j among the test cycles is calculated as follows:

$$\theta_{tag\ j} = \frac{\sqrt{\frac{\sum_{k=1}^{L}(\gamma_{cycle\ k,\ tag\ j} - \gamma_{case\ i,tag\ j}/N)^2}{L-1}}}{\gamma_{case\ i,tag\ j}/N}$$

In an example embodiment, a comparison may be made between at least one of test case distribution imbalance rate, tester system workload imbalance rate and feature coverage imbalance rate where the feature coverage system 105 has calculated a weighted metric for each test case in a plurality of test cases and assigned those test cases to test cycles, and a respective at least one of test case distribution imbalance rate, tester system workload imbalance rate and feature coverage imbalance rate where the feature coverage system 105 has not calculated a weighted metric and assigned test cases to their respective test cycles to illustrate the benefit provided by the feature coverage system 105.

Accordingly, the particular processing operations and other functionality described in conjunction with the flow diagram of FIG. 2 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve distribution of test cases among test cycles. These and other embodiments can effectively improve test related feature coverage and global distribution balance relative to conventional approaches. For example, embodiments disclosed herein provide an automated, comprehensive assignment of test cases to test cycles. Embodiments disclosed herein provide a system for distributing test cases evenly among test cycles and tester systems to insure providing optimal balance when assigning test cases to test cycles. Embodiments disclosed herein maximize the effectiveness and efficiency of the test cycles by detecting failures early in the testing cycles and re-testing test cases. Embodiments disclosed herein distribute test cases evenly within tester systems balance workload among the tester systems and assign higher priority test cases earlier within the test cycle. Embodiments disclosed herein provide a system that is easily scaled with regard to test cases and test cycles.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a give container of cloud infrastructre illustratively comprises a Docker container of other type of Linux® Container (LXC). The containers are run on virtual machines in a multi-tenant environment, although other arrangements are possible. The containers are utilized to implement a variety of different types of functionality within the information processing system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 3 and 4. Although described in the context of the information processing system 100, these platforms may also be used to implement at least portions of other information processing systems in other embodiments.

Figure 3:
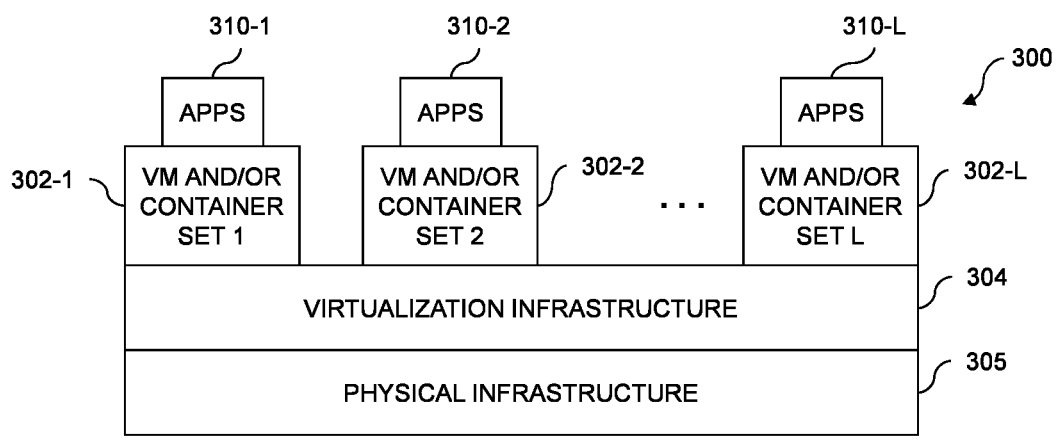
FIGS. 3 and 4 show examples of processing platforms that may be utilized to implement at least a portion of a feature coverage system embodiments.
Figure 4:
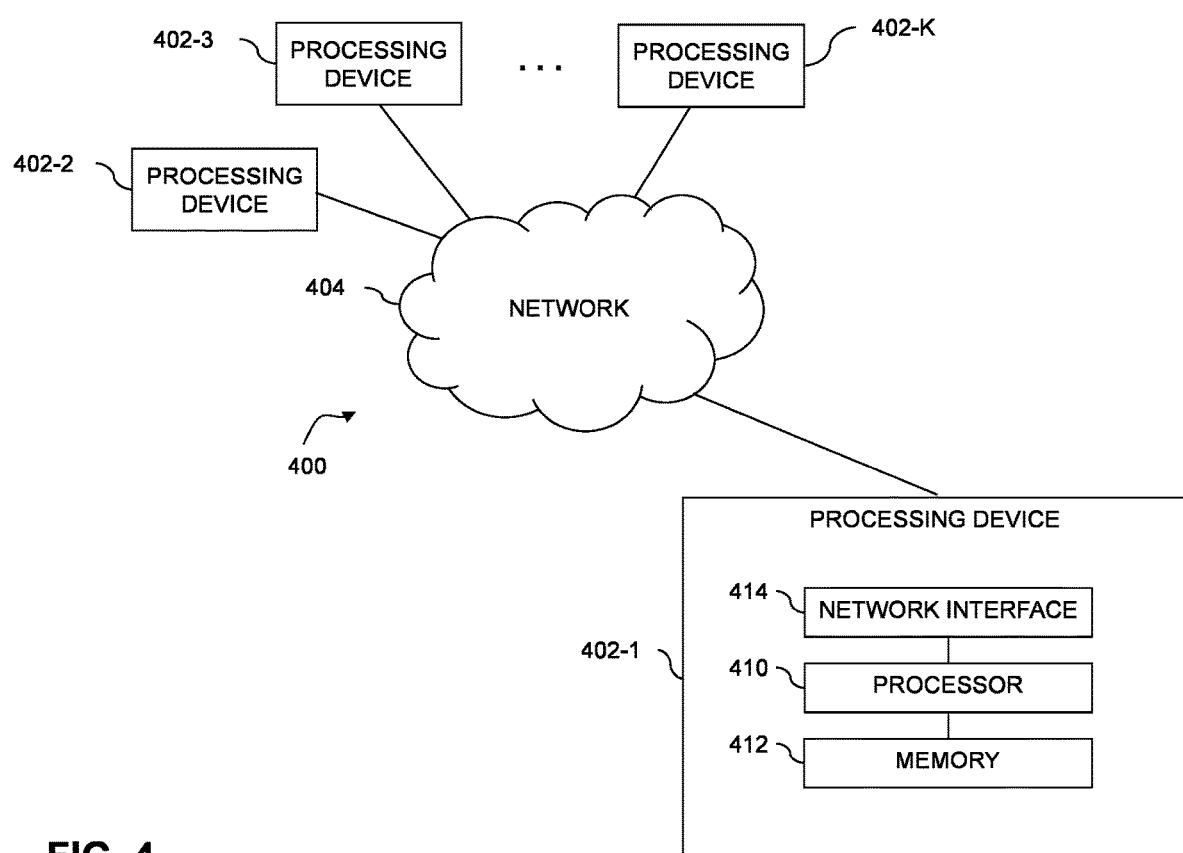

FIG. 3 shows an example processing platform comprising cloud infrastructure 300. The cloud infrastructure 300 comprises a combination of physical and virtual processing resources that are utilized to implement at least a portion of the information processing system 100. The cloud infrastructure 300 comprises multiple virtual machines (VMs) and/or container sets 302-1, 302-2, . . . 302-L implemented using virtualization infrastructure 304. The virtualization infrastructure 304 runs on physical infrastructure 305, and illustratively comprises one or more hypervisors and/or operating system level virtualization infrastructure. The operating system level virtualization infrastructure illustratively comprises kernel control groups of a Linux® operating system or other type of operating system.

The cloud infrastructure 300 further comprises sets of applications 310-1, 310-2, . . . 310-L running on respective ones of the VMs/container sets 302-1, 302-2, . . . 302-L under the control of the virtualization infrastructure 304. The VMs/container sets 302 comprise respective VMs, respective sets of one or more containers, or respective sets of one or more containers running in VMs. In some implementations of the FIG. 3 embodiment, the VMs/container sets 302 comprise respective VMs implemented using virtualization infrastructure 304 that comprises at least one hypervisor.

A hypervisor platform may be used to implement a hypervisor within the virtualization infrastructure 304, where the hypervisor platform has an associated virtual infrastructure management system. The underlying physical machines comprise one or more distributed processing platforms that include one or more storage systems.

In other implementations of the FIG. 3 embodiment, the VMs/container sets 302 comprise respective containers implemented using virtualization infrastructure 304 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of the information processing system 100 may each run on a computer, server, storage device or other processing platform element. A given such element is viewed as an example of what is more generally referred to herein as a "processing device." The cloud infrastructure 300 shown in FIG. 3 may represent at least a portion of one processing platform. Another example of such a processing platform is processing platform 400 shown in FIG. 4.

The processing platform 400 in this embodiment comprises a portion of the information processing system 100 and includes a plurality of processing devices, denoted 402-1, 402-2, 402-3, . . . 402-K, which communicate with one another over a network 404.

The network 404 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 402-1 in the processing platform 400 comprises a processor 410 coupled to a memory 412.

The processor 410 comprises a microprocessor, a microcontroller, an application-specific integrated circuit (ASIC), a field-programmable gate array (FPGA) or other type of processing circuitry, as well as portions or combinations of such circuitry elements.

The memory 412 comprises random access memory (RAM), read-only memory (ROM) or other types of memory, in any combination. The memory 412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and the information processing system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
selecting a test case from a plurality of test cases in a software testing lifecycle system; calculating, by a feature coverage system, a weighted metric associated with a test cycle for each test cycle in a plurality of test cycles,
wherein each of the plurality of test cycles comprises a subset of the plurality of test cases;
using the weighted metric, determining, by the feature coverage system, a test cycle in which to assign the test case to balance test feature coverage within the plurality of test cycles;
assigning, by the feature coverage system, the test case to the test cycle; and
executing the test cycle on a system; and
evaluating at least one of test case distribution imbalance rate, tester system workload imbalance rate and feature coverage imbalance rate to assess test case assignment performance of the feature coverage system,
wherein the method is implemented by at least one processing device comprising a processor coupled to a memory;
repeating the steps of selecting, calculating, determining, and assigning for the each test case that is not assigned.

2. The method of claim 1 further comprising:
detecting a test failure that occurred during the execution of the test cycle on the system; and
defining the plurality of test cases based on the test failure.

3. The method of claim 1 further comprising:
for each test case in the plurality of test cases:
determining whether the each test case is assigned to any test cycle in the plurality of test cycles.

4. The method of claim 1 wherein selecting the test case from the plurality of test cases comprises:
determining the test case has a dependency on a second test case;
determining the second test case is not assigned to any test cycle in the plurality of test cycles; and
selecting the second test case instead of the test case.

5. The method of claim 1 wherein selecting the test case from the plurality of test cases comprises:
    determining the test case has a dependency on a second test case;
    determining the second test case is assigned to a second test cycle in the plurality of test cycles, wherein the plurality of test cycles has an order of execution starting from a first test cycle through a last test cycle; and
    modifying the plurality of test cycles to remove the second test cycle and any test cycles that are scheduled to execute prior to the second test cycle according to the order of execution, from the plurality of test cycles when determining the weighted metric associated with the test cycle for each test cycle in the plurality of test cycles.

6. The method of claim 1 wherein determining, by the feature coverage system, the test cycle in which to assign the test case comprises:
    selecting the test cycle with a minimum weighted metric from the plurality of test cycles.

7. The method of claim 6 wherein selecting the test cycle with the minimum weighted metric from the plurality of test cycles comprises:
    identifying a subset of the plurality of test cycles, wherein each of the subset has the minimum weighted metric; and
    selecting one of the subset based on a priority of execution associated with the test case.

8. The method of claim 7 wherein selecting one of the subset based on the priority of execution associated with the test case comprises:
    identifying the priority of execution as a highest priority; and
    selecting an earliest executing test cycle in the plurality of test cycles as the one of the subset, wherein the plurality of test cycles has an order of execution starting from a first test cycle through a last test cycle.

9. The method of claim 7 wherein selecting one of the subset based on the priority of execution associated with the test case comprises:
    identifying the priority of execution as a medium priority; and
    randomly selecting a random test cycle in the plurality of test cycles as the one of the subset.

10. The method of claim 7 wherein selecting one of the subset based on the priority of execution associated with the test case comprises:
    identifying the priority of execution as a lowest priority; and
    selecting a last test cycle in the plurality of test cycles as the one of the subset, wherein the plurality of test cycles has an order of execution starting from a first test cycle through the last test cycle.

11. The method of claim 1 wherein each test case within a test cycle comprises an attribute set comprising at least one of a test case tag identifying features tested by the test case, test case execution time, tester system responsible for invoking execution of the test case, priority of execution of the test case, prior case dependency associated with the test case and test cycle to which the test case is assigned.

12. The method of claim 1 wherein calculating, by the feature coverage system, the weighted metric comprises:
    determining an extent to which a test case feature is covered within a test case.

13. The method of claim 1 wherein calculating, by the feature coverage system, the weighted metric comprises:
    determining an extent to which a test case feature is covered within a test cycle.

14. The method of claim 1 wherein calculating, by the feature coverage system, the weighted metric comprises:
    determining a test case feature coverage metric comprising an extent to which a plurality of test case features associated with a test case is covered within a test cycle.

15. The method of claim 1 wherein calculating, by the feature coverage system, the weighted metric comprises:
    determining a test case workload metric associated with a tester system invoking execution of the test cycle, wherein the test case workload metric is comprised of a total execution time of test cases within the test cycle and a predefined time period during which the tester system executes the test cycle.

16. The method of claim 1 wherein the weighted metric comprises a test case feature coverage metric, and a test case workload metric.

17. The method of claim 16 wherein the weighted metric comprises weighting each of the test case feature coverage metric and the test case workload metric.

18. A system comprising:
    at least one processing device comprising a processor coupled to a memory; the at least one processing device being configured:
    to select a test case from a plurality of test cases in a software testing lifecycle system;
    to calculate, by a feature coverage system,
    a weighted metric associated with a test cycle for each test cycle in a plurality of test cycles, wherein each of the plurality of test cycles comprises a subset of the plurality of test cases;
    using the weighted metric, to determine, by the feature coverage system, a test cycle in which to assign the test case to balance test feature coverage within the plurality of test cycles;
    to assign, by the feature coverage system, the test case to the test cycle; and
    to execute the test cycle on a system; and
    to evaluate at least one of test case distribution imbalance rate, tester system workload imbalance rate and feature coverage imbalance rate to assess test case assignment performance of the feature coverage system;
    repeating the steps of selecting, calculating, determining, and assigning for the each test case that is not assigned.

19. A computer program product comprising a non-transitory processor-readable storage medium having stored therein program code of one or more software programs, wherein the program code when executed by at least one processing device causes said at least one processing device:
    to select a test case from a plurality of test cases in a software testing lifecycle system;
    to calculate, by a feature coverage system, a weighted metric associated with a test cycle for each test cycle in a plurality of test cycles, wherein each of the plurality of test cycles comprises a subset of the plurality of test cases;
    using the weighted metric, to determine, by the feature coverage system, a test cycle in which to assign the test case to balance test feature coverage within the plurality of test cycles;
    to assign, by the feature coverage system, the test case to the test cycle; and
    to execute the test cycle on a system; and to evaluate at least one of test case distribution imbalance rate, tester system workload imbalance rate and feature coverage imbalance rate to assess test case assignment performance of the feature coverage system;

repeating the steps of selecting, calculating, determining, and assigning for the each test case that is not assigned.

* * * * *